United States Patent [19]
Glatzer

[11] Patent Number: 5,555,666
[45] Date of Patent: Sep. 17, 1996

[54] CRAB FISHING BY REMOTE MONITORING

[76] Inventor: Mark Glatzer, 12 Percy Williams Dr., East Islip, N.Y. 11730

[21] Appl. No.: 278,801

[22] Filed: Jul. 22, 1994

[51] Int. Cl.⁶ .................................................. A01K 69/00
[52] U.S. Cl. .................................. 43/17; 43/100; 43/102; 43/105
[58] Field of Search .................................. 43/100, 102, 103, 43/105, 17

[56] References Cited

U.S. PATENT DOCUMENTS

| | | | |
|---|---|---|---|
| 132,476 | 10/1872 | Livaudais | 43/105 |
| 3,508,358 | 4/1970 | Lee | 43/105 |
| 4,141,172 | 2/1979 | Prosol | 43/105 |
| 4,434,575 | 3/1984 | Pearson | 43/100 |
| 4,831,774 | 5/1989 | Gonzalez | 43/102 |
| 4,980,989 | 1/1991 | Davis | 43/102 |
| 5,133,149 | 7/1992 | Smyly | 43/100 |

*Primary Examiner*—Kurt Rowan
*Attorney, Agent, or Firm*—Lieberman & Nowak

[57] ABSTRACT

A device for use with a conventional crab trap comprising an audio transducer encased in a material to make it look like bait, placed in the crab trap and connected to an amplifier and speaker to enable the fisherman to monitor the trap for signs that the crab has entered the trap and spring the trap at the correct time.

4 Claims, 2 Drawing Sheets

CRAB FISHING BY REMOTE MONITORING

BACKGROUND OF INVENTION

The invention relates to the art of fishing, specifically to fishing for crabs and other game, using traps.

Various types of traps are used in fishing for crabs. The general method relates to a type of trap which is baited with fish, chicken, etc. The crab is lured into the trap by the bait and the fisherman traps the crab by triggering a line which closes the walls of the trap around the crab. The fisherman then pulls the trap out of the water to collect the trapped crab.

While this is a popular method of fishing, it has various drawbacks. On problem with this method is that there is no way of telling whether or not any crabs have been trapped. Periodic checking of the crab trap is required due to the inability to tell whether crabs have entered the trap. This disturbs the bait, the trap and the underwater surroundings holding the trap. This will result in a reduced catch.

The inability to tell whether crabs have entered the trap results in other problems. Specifically, failure to empty the trap after crabs have been caught may result in the crabs cannibalizing each other. Also, a filled trap will result in a reduced catch, since crabs will be dissuaded from entering the filled trap by the presence of the other crabs. Finally, exhausted bait will result in a reduced catch.

SUMMARY OF THE INVENTION

It is the general object of the present invention to provide a method and device to enable a fisherman to detect activity in and around a trap placed underwater so that the fisherman is able to determine when a crab or other game has entered a trap.

More specifically, the object of the invention is to provide an audio transducer positioned in an underwater trap to detect activity by the crab or game in the trap. This audio transducer is in turn connected to a remotely located amplifier and speaker which enables a fisherman, above the surface of the water, to monitor the activity. Once the fisherman detects the activity in the trap, he is able to trigger and pull the trap out of the water, assured that there will be crabs or other game in the trap. This device and method allows the fisherman to leave the trap and its surroundings undisturbed when there are no crabs or game present.

Another related object of the invention is to provide artificial bait for crabs and other game out of a material that need not be periodically replenished.

DESCRIPTION OF THE PREFERRED EMBODIMENTS

While the invention will be described in connection with a preferred embodiment, it will be understood that it is not intended to limit the invention to the described embodiment. On the contrary, it is intended to cover all alternatives, modifications and equivalents as may be included within the spirit and scope of the invention as defined by the appended claims.

I have found that crabs, particularly when entering traps, make a significant amount of noise, water being the ideal sound carrier. By the inventive device one can actually hear crabs walking along the trap and at such time the trap may be sprung from the surface in the conventional matter.

Figure 1:
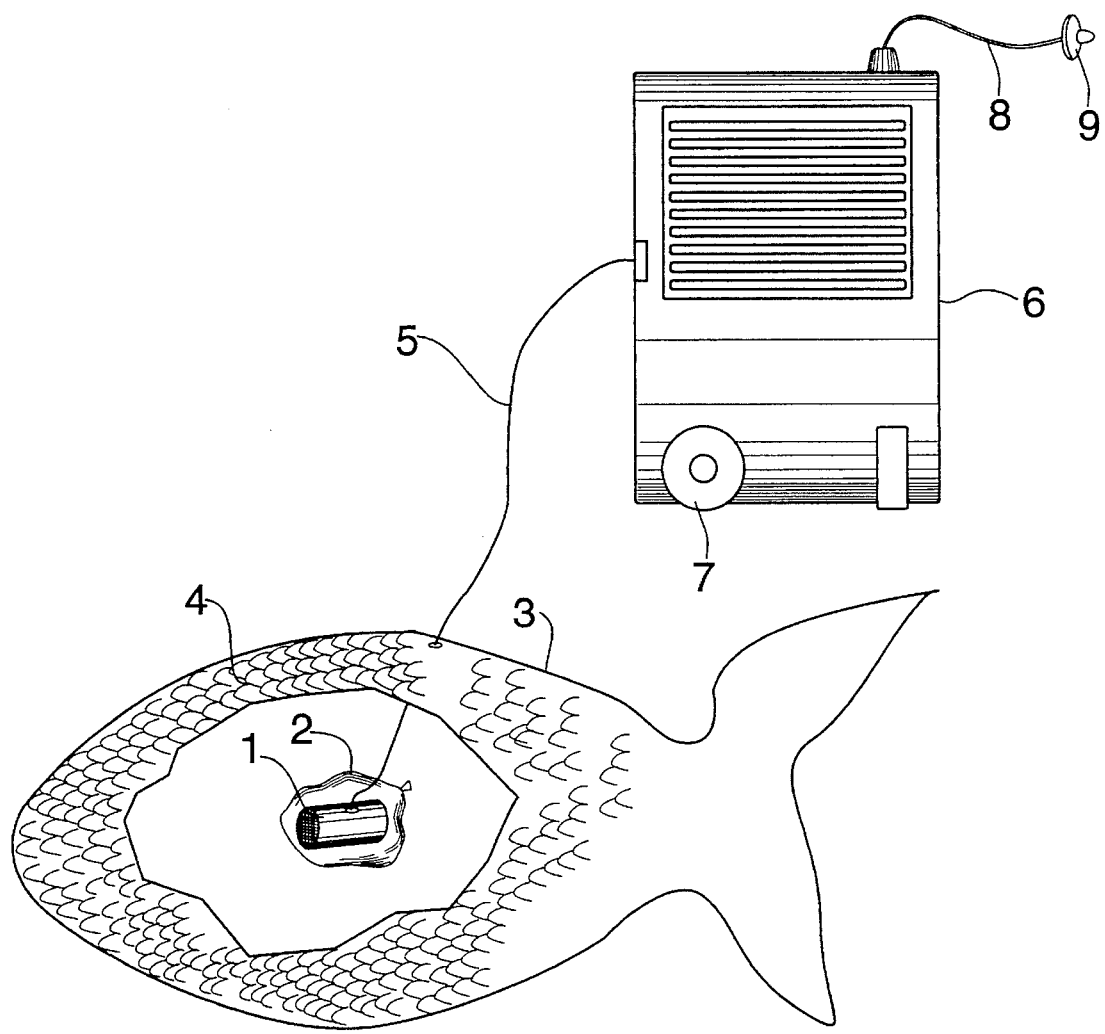
FIG. 1 is a view of a microphone in plastic and epoxy formed to resemble bait and connected to an amplifier and speaker.

FIG. 1 illustrates a preferred embodiment of the inventive device. The audio transducer is preferably a microphone 1 which is able to detect the sound of activity of crabs or other game entering the trap. The microphone 1 is encased in a plastic bag 2 and then in a resin-like material 3, molded to resemble bait.

Connected to the microphone 1 is a wire 5 for attaching the microphone 1 to an amplifier 6 which enables the fisherman, above the surface of the water, to monitor the activity picked up by the microphone 1. The preferred embodiment of the inventive amplifier 6 contains a volume control 7. The amplifier 6 is connected by wire 8 to an earphone 9.

In one embodiment of the invention, the fisherman places the microphone 1 in the trap and then baits the trap with fish, chicken, etc., which will attract the crabs or other game the fisherman wishes to trap.

Alternatively, the microphone 1 is encased in the bait in order to hide the microphone 1 from the crabs and to enhance the ability of the microphone 1 to pick up the sounds of activity. Since it is the bait which attracts the crab's attention, placing the microphone 1 in the bait assures that the microphone 1 will be at the center of the crab's activity.

In a preferred embodiment, the microphone 1 is encased in an artificial material, such as an epoxy resin or other waterproof, moldable material. One advantage of using a moldable material is that it is easier to encase the microphone 1 within it. By encasing a microphone 1 first in a plastic bag 2 and then in a resin-like material 3, the microphone 1 may itself be made to look like bait which can then be scented by merely rubbing dead fish on the outside. Indeed, if the molded bait is left a little scaly, its rough exterior 4 can hold tiny pieces of bait for some length of time.

The artificial material 3, since it is moldable, can be formed into any number of shapes, including fish, chicken, etc., or any other bait that will attract various types of crabs or other game.

In addition, the artificial material does not need to be replenished like the natural bait.

Figure 2:
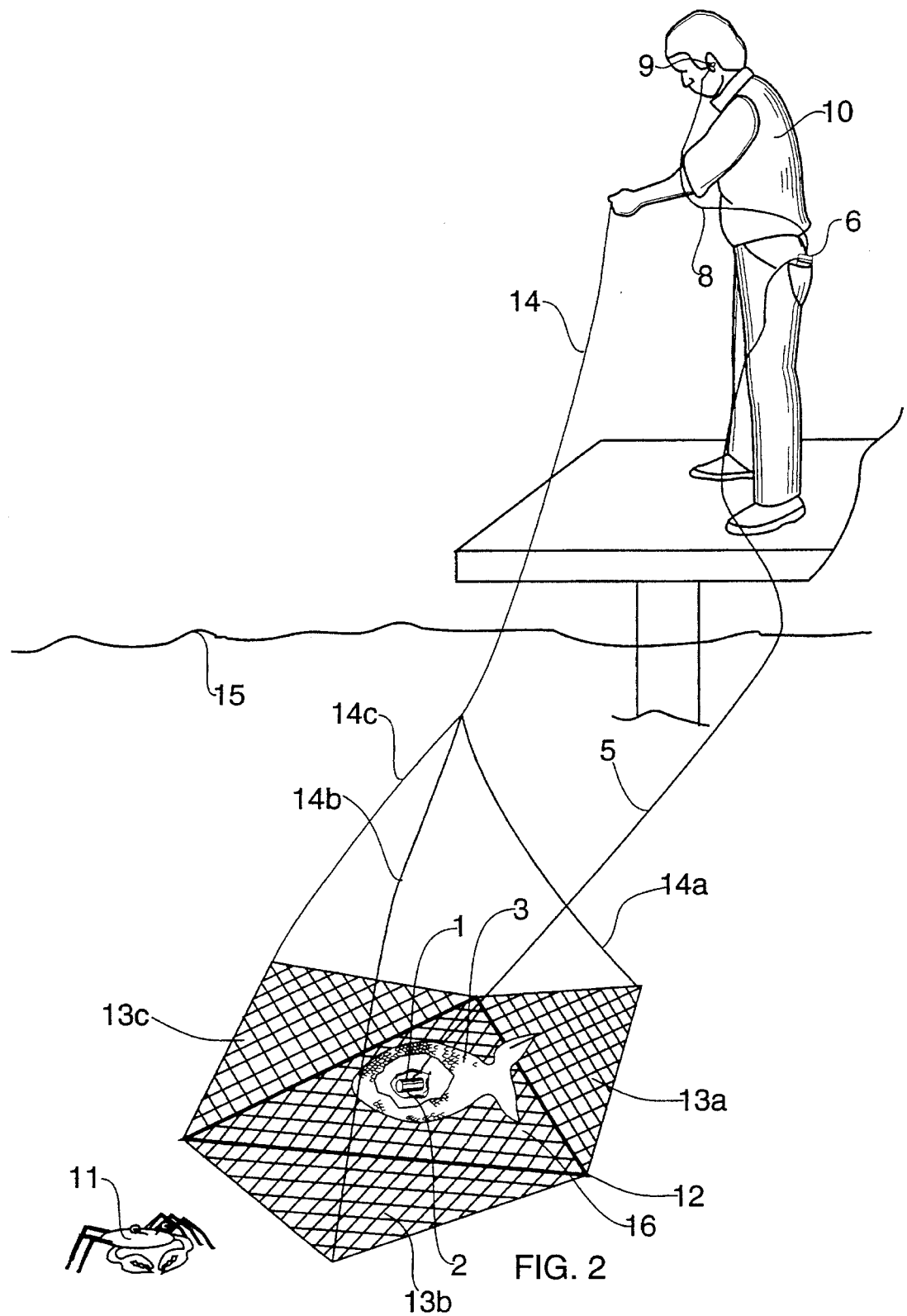
FIG. 2 is a view of the microphone encased in bait and in place in an underwater crab trap, with a remotely located amplifier and speaker being utilized by a fisherman.

FIG. 2 illustrates a fisherman 10, located above the surface of the water 15, utilizing the inventive device. As crab 11 approaches and enters the trap 12, the microphone 1, enclosed in the plastic bag 2 and resin molded to resemble bait 3, will detect the sounds of the activity as amplified by the amplifier 6 and transmitted through the earplug 9. The fisherman 10 can, at the correct moment, spring the trap 12 through the trigger line 14 which activates lines 14a, 14b and 14c and shuts the trap walls 13 a, b and c, thereby trapping the crab 11 in the trap 12 and then pull the filled trap up out of the water. In a preferred embodiment, the microphone 1 is attached to the base 16 of the trap 12. When a metal trap is used, the sound of a crab entering the trap and traveling along the metal base of the trap is transmitted through the metal and in turn through the microphone/audio transducer to the amplifier and speaker.

I claim:

1. A device for use with a conventional crab trap, closeable from the surface by a trigger line, comprising:

audio transducer positioned within the trap, an amplifier and speaker remotely located and adjacent the trigger line, wire means connecting the audio transducer to the amplifier and speaker, and wherein the audio transducer is encased within a molded form which resembles bait, whereby said audio transducer, signals, via said wire means, amplifier and speaker, the occurrence of activity within said crab trap.

2. The device claimed in claim 1 where the audio transducer is attached to the base of the trap.

3. A device for use with a conventional crab trap closeable from the surface by a trigger line, comprising:

an audio transducer positioned within the trap, said audio transducer encased within a molded form which resembles bait, an amplifier and speaker remotely located and adjacent the trigger line, and wire means connecting the audio transducer to the amplifier and speaker, whereby said audio transducer, signals, via said wire means, amplifier and speaker, the occurrence of activity, within said crab trap.

4. The device of claim 3 where said audio transducer is attached to the base of the trap.

* * * * *